United States Patent [19]

Aoyama et al.

[11] Patent Number: 4,701,371

[45] Date of Patent: Oct. 20, 1987

[54] MAGNETIC RECORDING MEDIUM

[75] Inventors: Shigeo Aoyama, Kyoto; Yoshinori Yamamoto, Takatsuki, both of Japan

[73] Assignee: Hitachi Maxwell, Ltd., Osaka, Japan

[21] Appl. No.: 878,782

[22] Filed: Jun. 26, 1986

[30] Foreign Application Priority Data

Jun. 26, 1985 [JP]  Japan .................................. 59-140079

[51] Int. Cl.$^4$ ................................................ G11B 5/70
[52] U.S. Cl. ..................................... 428/323; 427/131; 428/694; 428/900
[58] Field of Search ....................... 428/323, 694, 900; 427/131; 360/134

[56] References Cited

U.S. PATENT DOCUMENTS

| | | | |
|---|---|---|---|
| 4,117,190 | 9/1978 | Akashi et al. | 428/900 |
| 4,328,935 | 5/1982 | Steel | 427/131 |
| 4,442,171 | 4/1984 | Sato et al. | 428/900 |
| 4,469,758 | 9/1984 | Scott | 428/900 |

*Primary Examiner*—Paul J. Thibodeau
*Attorney, Agent, or Firm*—Birch, Stewart, Kolasch & Birch

[57] ABSTRACT

A magnetic recording medium having good running stability and high electromagnetic characteristics which comprises a base film, a magnetic layer provided on one surface of the base film and a back coat layer provided on the other surface of the base film, said back coat layer comprising non-magnetic oxide particles at least one of complex oxide or oxide solid solutions of the $SiO_2$ or $TiO_2$ system.

8 Claims, No Drawings

MAGNETIC RECORDING MEDIUM

The present invention relates to a magnetic recording medium. More particularly, it relates to a magnetic recording tape comprising a base film, a magnetic layer provided on one surface (i.e. the major surface) of the base film and a back coat layer provided on the other surface (i.e. the back surface) of the base film.

In general, a magnetic recording tape comprises a base film and a magnetic layer provided on the major surface of the base film. In order to assure good magnetic characteristics, the surface of the magnetic layer is finished in order to be smooth. For improvement of the running stability, the back coat layer is formed by the use of non-magnetic particles uniformly dispersed in a resinous binder so as to roughen the back surface. However, when the back surface has been roughened excessively, the surface state at the back coat layer is transferred to the smooth surface of the magnetic layer, and as a result, the electromagnetic characteristics are excessively deteriorated. For this reason, the non-magnetic particles for the back coat layer are required to be so fine so as to be able to impart an appropriate roughness to the back surface while maintaining the improvement of the running stability. Examples of the non-magnetic particles which are readily available, are $BaSO_4$, $CaCO_3$, etc. An attempt has also been made to incorporate such non-magnetic oxide particles heretofore used for improvement of the abrasion resistance of the magnetic layer as $Al_2O_3$ and $TiO_2$ into said non-magnetic particles.

In general, the non-magnetic particles as heretofore used for the back coat layer do not have good compatibility with the resinous binder therein, and their dispersibility in the back coat layer is insufficient. For this reason, the surface state of the back coat layer becomes inferior and affords an unfavorable influence on the smooth surface of the magnetic layer. Also, the non-magnetic particles are apt to be eliminated from the back coat layer during the running, and the abrasion resistance is thus lowered. As a result, the electromagnetic characteristics and the running stability are frequently deteriorated.

In order to overcome the above drawback, an extensive study has been made, and it has been found that certain specific complex oxides or oxide solid solutions have good compatibility with the resinous binder in the back coat layer and maintain high dispersibility in the back coat layer. Thus, the surface of the back coat layer can be maintained in a state which does not unfavorably effect the magnetic layer. In addition, said non-magnetic oxide particles are hardly eliminated, and the back coat layer can be kept highly abrasion-resistant. It is therefore possible to provide a magnetic recording medium having a back coat layer which can maintain not only the running stability but also satisfactorily maintain the electromagnetic characteristics.

The magnetic recording medium of the present invention comprises a base film, a magnetic layer provided on one surface of the base film and a back coat layer provided on the other surface of the base film, said back coat layer comprising non-magnetic oxide particles of complex oxides or oxide solid solutions of the $SiO_2$ or $TiO_2$ system.

As understood from the above, the magnetic recording medium of the invention is characteristic in comprising non-magnetic particles of complex oxides or oxide solid solutions of the $SiO_2$ or $TiO_2$ system. The complex oxides of the $SiO_2$ or $TiO_2$ system may constitute at least one selected from $SiO_2$ or $TiO_2$ and at least one other oxide in a constant or definite proportion. Examples of such complex oxides are aluminum titanate ($Al_2O_3.TiO_2$), forsterite ($2MgO.SiO_2$), enstatite ($MgO.SiO_2$), zircon ($ZrO_2.SiO_2$), mullite ($3Al_2O_3.2SiO_2$), cordierite ($2MgO.2Al_2O_3.5SiO_2$), sapphirine ($4MgO.5Al_2O_3.2SiO_2$), spodumene ($Li_2O.Al_2O_3.4SiO_2$), eucryptite ($Li_2O.Al_2O_3.2SiO_2$), petalite ($Li_2O.Al_2O_3.8SiO_2$), beryl ($3BeO.Al_2O_3.6SiO_2$), celsian ($BaO.Al_2l\ O_3.2SiO_2$), etc. Among those, preferred are mullite, aluminum titanate, cordierite, zircon, spodumene, etc. Those particularly preferred are mullite, aluminum titanate, cordierite, etc. The oxide solid solutions of the $SiO_2$ or $TiO_2$ system may likewise constitute at least one selected from $SiO_2$ or $TiO_2$ and at least one other oxide, but the proportion of these oxide components are not constant or definite. Examples of the oxides which constitute said oxide solid solutions may be those which constitute the complex oxides.

The average particle size of the non-magnetic oxide particles is normally not more than about 0.2 micron, preferably from about 0.02 to 0.1 micron. When the average particle size exceeds said upper limit, the surface property of the back coat layer becomes inferior, and the surface smoothness of the magnetic layer is unfavorably influenced and the electromagnetic characteristics are deteriorated. When the average particle size is smaller than said lower limit, the surface of the back coat layer is too smooth, and the running stability is hardly improved. The non-magnetic oxide particles having said average particle size can be readily prepared by pulverizing the particles by the aid of a conventional pulverization machine such as centrifugal mill or ball mill. The hardness of the non-magnetic oxide particles depends on the kind of the particle and is usually not less than about 4 in Moh's hardness, preferably not less than about 6 in Moh's hardness.

The kind of the non-magnetic oxide particles is not necessarily limited to single. Two or more kinds may be employed. In general, the non-magnetic oxide particles may be used from about 20 to 80% by weight, preferably from about 35 to 70% by weight based on the total weight of the non-magnetic oxide particles and the resinous binder. When the amount is too small, it is not possible to impart an appropriate roughness to the back coat layer, and good running stability is hardly obtained. When the amount is too large, the non-magnetic oxide particles tend to be eliminated during the running. The eliminated particles attach on the surface of the magnetic layer so that the electromagnetic characteristics are unfavorably influenced. Further, the running stability may be deteriorated.

The magnetic recording medium of the invention may be prepared by a conventional procedure. For instance, it may be prepared by applying, a magnetic coating composition comprising magnetic particles and a resinous binder dispersed or dissolved in a liquid medium, onto one surface (i.e. the major surface) of a base film, such as a polyester (e.g. polyethylene terephthalate) film usually having a thickness of about 4 to 15 microns, followed by drying to form a magnetic layer usually having a thickness of about 1.5 to 10 microns. Alternatively, the magnetic layer may be formed by deposition of a vaporized magnetic metal onto the major surface of the base film. Onto the other surface (i.e. the back surface) of the base film, a non-magnetic coating composition comprising the non-magnetic oxide particles and a resinous binder dispersed or dissolved in a liquid medium is applied, followed by drying to make a back coat layer usually having a thickness of about 0.3 to 3 microns.

The magnetic coating composition comprises magnetic particles and a resinous binder therefor dispersed or dissolved in a liquid medium. As the magnetic particles, there may be used particles of gamma—$Fe_2O_3$ or intermediary oxides thereto, particles of $Fe_3O_4$ or intermediary oxides thereto, particles of Co-containing gamma—$Fe_2O_3$ or intermediary oxides thereto, particles of Co-containing $Fe_3O_4$, $CrO_2$ particles, Sb-containing $CrO_2$ particles, Fe particles, Co particles, Fe—Ni particles, Fe—Co—Ni particles, barium-ferrite particles, strontium-ferrite particles, etc. These magnetic particles have usually an average particle size (longer) of about 0.05 to 1 micron. Examples of the resinous binder are polyvinyl chloride, vinyl chloride/vinyl acetate copolymer, polybutyral resin, polyacetal resin, polyurethane resin, polyester resin, acrylic resin epoxy resin, phenol resin, polyol resin, amino resin, synthetic rubber resin, cellulose resin, isocyanate compounds, etc. As the liquid medium, there may be usually employed one or more organic solvents chosen from ketones (e.g. cyclohexanone, methylethylketone, methylisobutyl ketone), esters (e.g. ethyl acetate, butyl acetate), aromatic hydrocarbons (e.g. benzene, toluene, xylene), alcohols (e.g. isopropanol), acid amides (e.g. dimethylformamide), sulfoxides (e.g. dimethylsulfoxide), ethers (e.g. tetrahydrofuran, dioxane), etc. In addition to or in place of the organic solvent, water and an emulsifier may be also used so as to give an emulsion type coating composition. In any event, other additives such as dispersing agents, lubricating agents, polishing agents and antistatic agents may be optionally incorporated into the coating composition. The contents of the magnetic particles and the resinous binder in the magnetic coating composition are not limitative, but usually the weight proportion of the magnetic particles and the resinous binder may be from about 6:4 to 9:1.

The non-magnetic coating composition comprises non-magnetic oxide particles and a resinous binder therefor dispersed or dissolved in a liquid medium. As the resinous binder and the liquid medium, there may be used those as exemplified with respect to the magnetic coating composition. In addition, the coating composition may comprise optionally any other non-magnetic oxide particles (e.g. $TiO_2$, $Al_2O_3$, $BaSO_4$, $CaCO_3$) as conventionally employed for the back coat layer. The coating composition may also comprise optionally conventional additives such as dispersing agents, lubricating agents and antistatic agents.

As understood from the above, the back coat layer in the magnetic recording medium of the present invention is characteristic in comprising complex oxides or oxide solid solutions of the $SiO_2$ or $TiO_2$ system, and such back coat layer can assure a sufficient running stability without affording any unfavorable influence onto the magnetic layer. The back coat layer has high abrasion resistance, and the non-magnetic oxide particles are hardly removed therefrom. As the result, the magnetic recording medium can show excellent electromagnetic performances.

Practical and presently preferred embodiments of the invention are illustratively shown in the following examples wherein parts and % are by weight.

EXAMPLE 1

(A) Magnetic coating composition:-

| Materials | Part(s) |
| --- | --- |
| Co-containing magnetic iron oxide particles | 250 |
| Carbon black | 12 |
| alpha-Iron oxide particles | 10 |
| Nitrated cotton | 22 |
| Polyurethane resin | 19 |
| Trifunctional low molecular weight isocyanate compound | 7 |
| n-Butyl stearyl | 3 |
| Myristic acid | 2 |
| Liquid paraffin | 2 |
| Cyclohexanone | 340 |
| Toluene | 340 |

(B) Non-magnetic coating composition:-

| Materials | Part(s) |
| --- | --- |
| Fine particles of mullite ($3Al_2O_3.2SiO_2$) (average particle size, 0.07 micron) | 210 |
| Carbon black ("Black Pearl L" manufactured by Cabbot; volatile component, 5%) | 90 |
| Cellulose resin (nitrated cotton) | 100 |
| Polyurethane resin | 70 |
| Trifunctional low molecular weight isocyanate compound | 30 |
| n-Butyl stearate | 3 |
| Myristic acid | 2 |
| Liquid paraffin | 3 |
| Cyclohexanone | 750 |
| Toluene | 750 |

The materials under the item (A) were mixed together in a ball mill for 50 hours to make a magnetic coating composition. The composition was applied onto the major surface of a polyester film of 14 microns thick having good smoothness, followed by drying to make a magnetic layer of 5 microns thick, which was then subjected to surface treatment.

The materials under the item (B) were mixed together in a ball mill for 100 hours to make a non-magnetic coating compostion. The composition was applied onto the back surface of said polyester film, followed by drying to make a non-magnetic layer of 0.8 micron thick, which was then subjected to surface treatment and cut in a predetermined width to give a magnetic recording tape.

EXAMPLE 2

In the same manner as in Example 1 but using 210 parts of fine particles of aluminum titanate ($Al_2O_3.TiO_2$) (average particle size, 0.07 micron) for the non-magnetic coating composition in place of 210 parts of fine particles of mullite, there was prepared a magnetic recording tape.

EXAMPLE 3

In the same manner as in Example 1 but using 210 parts of fine aprticles of zircon ($ZrO_2.SiO_2$) (average particle size, 0.06 micron) for the non-magnetic coating composition in place of 210 parts of fine particles of mullite, there was prepared a magnetic recording tape.

EXAMPLE 4

In the same manner as in Example 1 but using 210 parts of fine particles of cordierite ($2MgO \cdot 2Al_2O_3 \cdot 5TiO_2$) (average particle size, 0.07 micron) for the non-magnetic coating composition in place of 210 parts of fine particles of mullite, there was prepared a magnetic recording tape.

EXAMPLE 5

In the same manner as in Example 1 but using 150 parts of fine particles of mullite and 60 parts of fine particles of aluminum titanate ($Al_2O_3 \cdot TiO_2$) (average particle size, 0.07 micron) for the non-magnetic coating composition in place of 210 parts of fine particles of mullite, there was prepared a magnetic recording tape.

EXAMPLE 6

In the same manner as in Example 1 but using 150 parts of fine particles of mullite and 60 parts of fine particles of titanium oxide ($TiO_2$) (average particle size, 0.07 micron) for the non-magnetic coating composition in place of 210 parts of fine particles of mullite, there was prepared a magnetic recording tape.

COMPARATIVE EXAMPLE 1

In the same manner as in Example 1 but using 150 parts of fine particles of barium sulfate ($BaSO_4$) (average particle size, 0.07 micron) and 60 parts of fine particles of titanium oxide (average particle size, 0.07 micron) for the non-magnetic coating composition in place of 210 parts of fine particles of mullite, there was prepared a magnetic recording tape.

With respect to the magnetic recording tapes as prepared in Examples 1 to 6 and Comparative Example 1, the surface smoothness (surface roughness at the centerline, averaged), the color S/N ratio (relative value taking the standard tape as O), the abrasion resistance of the back coat layer (the decrease of the S/N ratio after 100 times running in comparison with that before 100 times running) and the running stability (wow-flutta) were measured. The results are shown in the following table:

| Example | Surface roughness (micron) | Abrasion resistance (dB) | Color S/N ratio (dB) | Running stability (%) |
| --- | --- | --- | --- | --- |
| 1 | 0.02 | 0.5 | +4.5 | 0.06 |
| 2 | 0.02 | 0.5 | +4.5 | 0.06 |
| 3 | 0.02 | 0.7 | +4.0 | 0.08 |
| 4 | 0.02 | 0.5 | +4.2 | 0.07 |
| 5 | 0.02 | 0.6 | +4.0 | 0.08 |
| 6 | 0.03 | 0.8 | +4.0 | 0.10 |
| Comparative 1 | 0.04 | 1.0 | +3.8 | 4.0 |

As understood from the above table, the magnetic recording tape of the invention is provided with a back coat layer having excellent abrasion resistance and appropriate surface property and being satisfactory in both running stability and electromagnetic characteristics.

What is claimed is:

1. A magnetic recording medium which comprises a base film, a magnetic layer provided on one surface of the base film and a back coat layer provided on the other surface of the base film, said back coat layer comprising a resinous binder and non-magnetic oxide particles, characterized in that the non-magnetic oxide particles are of a complex oxide of at least one member chosen from the group consisting of mullite, aluminum titanate and cordierite and have an average particle size of about 0.02 to 0.1 micron and the amount of the non-magnetic oxide particles in the back coat layer is from about 20 to 80 % by weight based on the combined weight of the resinous binder and the non-magnetic oxide particles.

2. The magnetic recording medium according to claim 1, wherein the amount of the non-magnetic oxide particles comprised in the back coat layer is from about 35 to 70% by weight based on the combined weight of the resinous binder and the non-magnetic oxide particles.

3. The magnetic recording medium according to claim 1, wherein the complex oxide is mullite.

4. The magnetic recording medium according to claim 1, wherein the complex oxide is aluminum titanite.

5. The magnetic recording medium according to claim 1, wherein the complex oxide is cordierite.

6. The magnetic recording medium according to claim 2, wherein the complex oxide is mullite.

7. The magnetic recording medium according to claim 2, wherein the complex oxide is aluminum titanate.

8. The magnetic recording medium according to claim 2, wherein the complex oxide is cordierite.

* * * * *